United States Patent [19]

Galatha

[11] 4,408,121
[45] Oct. 4, 1983

[54] CODE FORMAT FOR BANK CHECK IDENTIFICATION

[75] Inventor: Matthew J. Galatha, Charlotte, N.C.

[73] Assignee: International Business Machines Corporation, Armonk, N.Y.

[21] Appl. No.: 347,131

[22] Filed: Feb. 9, 1982

[51] Int. Cl.³ .......................................... G06K 19/06
[52] U.S. Cl. .................................. 235/494; 235/462; 235/470; 235/487
[58] Field of Search .................... 235/462, 470, 494; 382/12

[56] References Cited

U.S. PATENT DOCUMENTS

| | | | |
|---|---|---|---|
| 3,663,802 | 5/1972 | Wildhaber | 235/494 |
| 3,780,271 | 12/1973 | Sharkitt et al. | 235/61.12 R |
| 3,845,279 | 10/1974 | Rosdorff | 235/61.12 N |
| 3,963,901 | 6/1976 | Gevas | 235/61.12 M |

*Primary Examiner*—Harold I. Pitts
*Attorney, Agent, or Firm*—E. Ronald Coffman

[57] ABSTRACT

A compact code format has marking elements of two distinctive lengths which lie across a set of parallel equal height code zones. The longer of the two lengths exceeds the length of the shorter by twice the height of a code zone, thereby providing a substantial uniformity of separation between all members of the code set.

10 Claims, 3 Drawing Figures

CODE FORMAT FOR BANK CHECK IDENTIFICATION

CROSS REFERENCE TO RELATED APPLICATION

The code format of this invention is useful in conjunction with a marking material, as described in Application Ser. No. 344,667 entitled, "Article Identification Material and Method and Apparatus for Using It", which was filed Feb. 1, 1982, and which is of common assignment herewith.

BACKGROUND OF INVENTION

Automatic processing of financial documents such as bank checks has been enhanced by the use of machine readable data, such as the well known machine and human readable E13-B and CMC-7 codes, as well as special purpose bar codes. These codes are generally configured to encode individual data items as a time-varying signal which is reproduced as the check passes a transducer while moving through a high speed check processing machine. The information content of the signal is an interrelated function of both the marking and the transport motion. Most code formats presently in use require a number of successive elements to identify each encoded character. Considering the limited size of most bank checks, these existing code formats severely restrict the amount of data that can be recorded in a single track along the length of the bank check.

There are known code formats, wherein characters are represented by one or more markings in a plurality of simultaneously sensed parallel fields. The common 80 column punched card is a well known example. In its simplist form there is one mark per encoded character. A plurality of parallel code zones are provided, one for each member of the encoded character set. Two or more marks may be used to encode many more characters than there are parallel zones. However, a code format that identifies characters by the use of multiple markings may be subject to substitution errors due to the failure to read one of the parallel markings or due to skew of the document which may align marks from adjacent characters. In other words, the markings for one or two characters may be partially common to markings of a different character.

SUMMARY OF THE INVENTION

My invention provides a code format for machine-readable markings wherein each character is represented by a single marking element selected from a predetermined set of different length marking elements. The marking element set of my preferred embodiment contains two members, long and short. The marking elements extend transversely across one or more code zones, which run parallel to the scanning direction of the bank check. Since each character is represented by a single element, the format provides for a dense encoding such that a series of 24 numeric characters can be reliably encoded in the space of approximately 17 mm in the direction of bank check transport through a high-speed check processing machine. This dense code format enables a number of such records to be placed at different times by different banking institutions on a check in different fields, but within a common processing track.

The code format of my invention maximizes the use of available space with respect to the distinguishable difference between the different members of the code set. To obtain this maximum use of space, it is necessary that the difference between adjacent members be substantially uniform since the reliability of the code is only as good as its weakest member. Extra space between some adjacent members is wasted space. Uniform orthogonal difference is obtained in my code format by defining equal height code zones and by requiring that each longer marking length exceed the next shorter by at least twice the height of the code zones. The optimum spacing is obtained where the shortest marking element is equal in height to the height of a code zone, and the difference in element length substantially equals twice the height of the code zones.

The embodiment of my coded format provides for the encoding of 10 numeric digits by code elements placed in six transverse zones and wherein the longer element occupies three zones and the shorter element occupies a single zone. A coded record of this configuration can be reliably read while requiring a total vertical height of all six zones of only about 4.7 mm.

To facilitate the read operation, I prefer to record a zone reference line that extends the full expanse of the six code zones at the beginning of a series of related code elements. This line is used by a reader to assure accurate interpretation of the transverse position of the code elements. Other aids to registration can be used instead of or in addition to the zone reference line. For example, a base line running parallel to the zones can assist accurate reading. A segmented base line can also provide a useful reference for locating successive digit code positions.

Because my code format contains no intelligence in the direction of check transport, reading of the code is relatively insensitive to spacing differences between code elements in this direction. Variations in scan velocity for example, between a device that originally printed the markings and a different device, operating at a different time, reading the markings, can cause such spacing differences. Furthermore, my code is particularly suited to being printed by a multi-nozzle ink jet printer. Since the nozzles of such a printer extend transverse to the check transport direction, the transverse location of printing can be quite accurate.

BRIEF DESCRIPTION OF THE DRAWINGS

These and other objects, features and advantages of the code format of my invention will be apparent to those skilled in the art from a reading and understanding of the following description of a preferred illustrative embodiment wherein reference is made to the accompanying drawings, of which

DESCRIPTION OF THE PREFERRED EMBODIMENT

Figure 1:
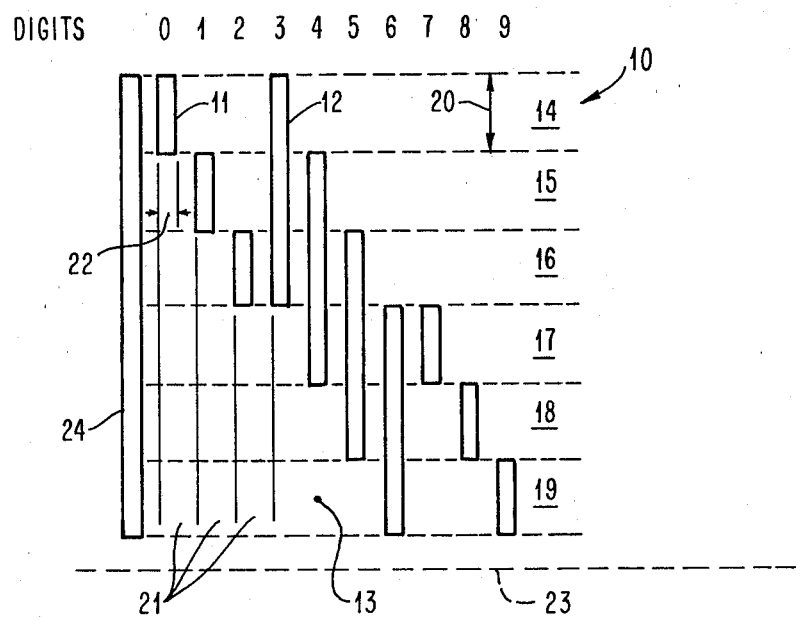
FIG. 1 is an enlarged layout view of the elements of a preferred embodiment of my code format.

FIG. 1 shows a record 10 illustrating a preferred embodiment of my code format for encoding the digits 0 through 9. The code format comprises for each of the digits or members of the code set, a single short or long marking element 11 or 12, respectively. The marking elements 11 and 12 have optical properties that contrast with the optical properties of the background region 13 formed by the surface of a document or other record base on which the elements have been printed. The elements are located in zones 14, 15, 16, 17, 18 and 19 which are each of equal height 20. Each marking element lies within one of a series of successive digit spaces 21 which preferably is wider than the dimension 22 of the marking element, to provide clear division between digits. The spaces 21 are disposed side-by-side along a line 23 which represents the intended relative motion between the code pattern 10 and a reader. Since the characteristic length of the elements 11 and 12 is transverse to the direction of reading motion, my code format is relatively insensitive to small variations of either reading or printing motion in the direction of line 23.

Although not an encoded character, I prefer to employ a zone reference line 24 that defines, by its extremities, the boundaries of zones 14 through 19. Line 24 must be clearly distinguishable from the elements 11 and 12. By storing the accurate location at which a zone reference line 24 is detected, a code reader can easily compute the location of zones 14 through 19.

From FIG. 1, it can be seen that the elements 11 are substantially equal in length to the zonal height 20. The longer elements 12 are longer than the elements 11 by substantially two times the zonal height 20. Thus, an element can be reliably distinguished even though distorted, misplaced or misread by up to half a zonal height 20. Since each digit 0 through 9 is represented by a single element 11 or 12 the opportunity for substitutions due to poorly executed or read characters is substantially reduced. Any time a reader detects two separate elements in a single space 21, an error condition is indicated and the document can be sorted to a reject bin for manual processing. For banking applications for which this code is intended, reject reading failures are much more acceptable than substitution failures. Multiple elements might be detected in a space 21 due to obliteration of the center portion of a long element 12 or to document skew which vertically aligns adjacent short elements 11. Smudged ink could produce the same effect.

Figure 2:
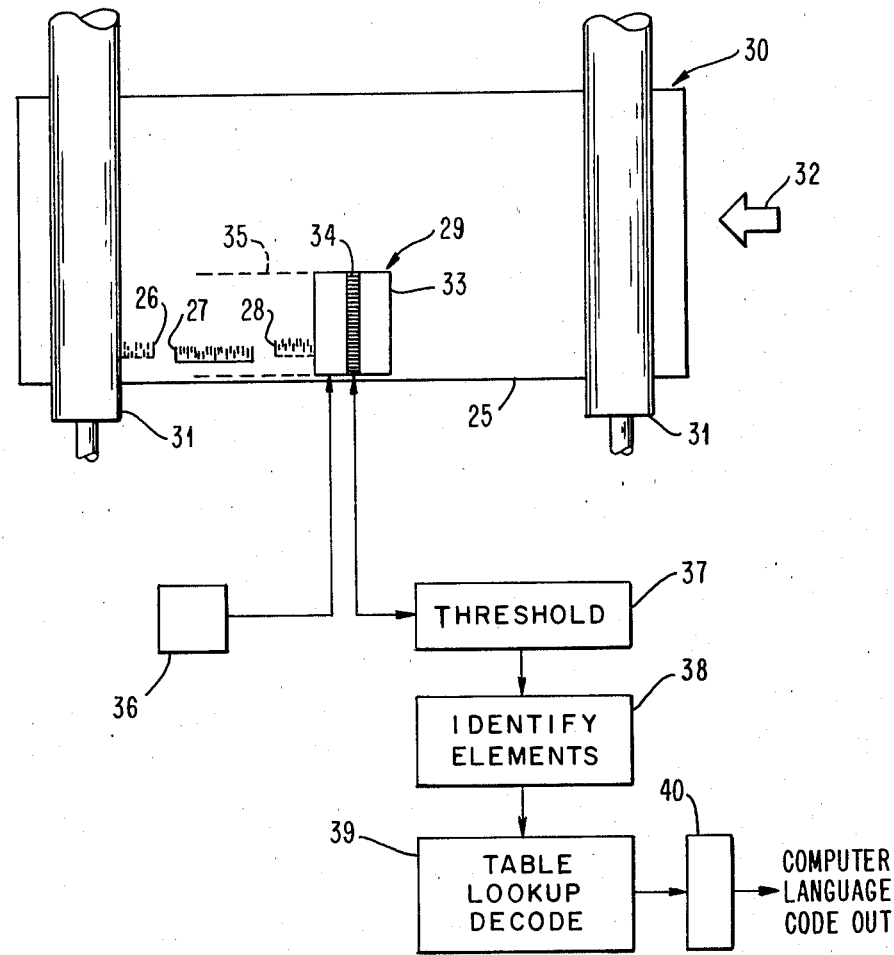
FIG. 2 is a simplified view of a suitable code reader showing a bank check that has been marked with several records using the code format of this invention.

FIG. 2 shows a record base such as the back of a bank check 25 that has been printed to include several separate digit series records 26, 27 and 28 using the code format of my invention. Preferably the records 26-28 are printed with an infrared fluorescent ink in accordance with the teachings of aforesaid application Ser. No. 344,667. The marking elements will in this case react to visible light to produce infrared radiation which passes a suitable filter to appear bright on a dark background to an infrared detector.

The check 25 is shown in FIG. 2 positioned adjacent the read station of a typical optical reader 29 for detecting the marking elements 11, 12 and the zone reference line 24. A check transport 30 having drive rollers 31 transports the check 25 in the direction of arrow 32. The reader includes a solid state scanner 33 having a row of 64 photodiodes 34. Scanner 33 is positioned to view a relatively wide track 35 extending along the length of check 25. Track 35 is twice as wide as the individual code records 26-28 so that the image of the marking elements will be captured regardless of some slight displacement vertically due to the different alignment of different printers creating the markings. Note, for example, that the code record 27 is slightly lower than the records 26 and 28.

Photodiode array 34 operates at closely spaced sampling times under the control of a strobe circuit 36 which is synchronized with the transport speed to define relatively uniform periods of displacement of the check 25. At each strobe signal from circuit 36, photodiode array 34 delivers analog data from each photodiode representing the light received from individual picture elements scanned to a threshold circuit 37. Threshold circuit 37 assigns a binary value, 1 or 0, to the picture elements and delivers the thus digitized data to a code-element-identifying operator 38 which relates the received patterns of 1's and 0's to each other and to data representing the location of zones 14 through 19 to recognize the length and location of elements 11 and 12, as received. Operator 38 represents the element identity, i.e. mark in zones 14-19, to a table-lookup decode operator 39 which has prestored the relationship between the element pattern with respect to zones 14-19 to the individual digits represented. Table-lookup decode operator 39 presents a conventional computer language code, representing the identified digit, to an output register 40, for use by the computer system requiring the data from the check 25.

Figure 3:
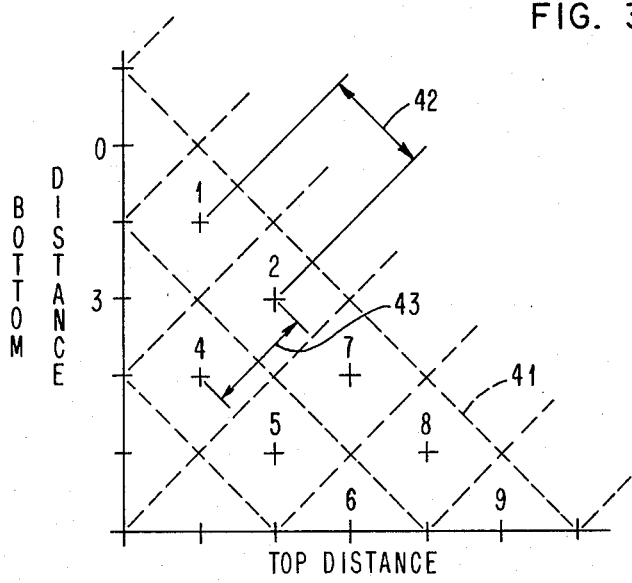
FIG. 3 is a graphic demonstration of the uniform orthogonal spacing between adjacent members of the code shown in FIG. 1.

The uniformity of orthogonal displacement between members of my code is graphically demonstrated in FIG. 3. The vertical axis in FIG. 3 represents the distance in terms of zonal heights 20, between the bottom of an element 11 or 12 and the lower edge of the lowest zone 19. Similarly, the horizontal axis represents the distance between the top of an element and upper edge of the topmost zone 14. Each of the elements of the code of FIG. 1 have been plotted as indicated by the digits they represent. The distance between adjacent digits shows the amount of distortion necessary for any digit to become confusable with another. The dash lines 41 show the half-way distance between adjacent digits. The elements can become confused when they are distorted sufficiently so as to cross these lines 41. The uniform strength of all members of my code set is thus shown by the equal distance 42 and 43 between digits 1 and 2, and 2 and 4, respectively.

Those skilled in the art will recognize that various modifications, additions and deletions can be made to the particular embodiment shown without departing from the scope of my invention. For example, larger character sets can be encoded by using three or more different length elements so long as the basic rules of my code format are followed.

I claim:

1. A record for machine reading, comprising a record base having on a surface thereof a background region of a first optical characteristic and a plurality of marking elements of a second, contrasting optical characteristic, said marking elements being individually arranged in successive spaces which are disposed side-by-side in a line, and wherein the improvement comprises:
   said elements being selected from a plurality of different predetermined lengths in their dimension transverse to said line, and being positioned in different ones of a predetermined set of equal height zones extending parallel to said line, each of said different lengths differing from the length nearest thereto by at least the height of two of said zones,
   whereby each element uniquely identifies by its length and location, a character of a predetermined set of characters.

2. A record as defined in claim 1 wherein said plurality of marking elements is preceded by a reference mark which extends parallel to said elements and which indicates by its end points, the extremities of said set of zones.

3. A record as defined in claim 1 wherein said record base comprises a bank check.

4. A record as defined in claim 1 wherein the length of the shortest of said elements is substantially equal to the height of one of said zones.

5. A record as defined in claim 4 wherein said predetermined set of characters comprises the digits 0 through 9, wherein there are six zones in said predetermined set of zones, and wherein only two lengths are employed to encode said set of characters, the longer of the two lengths being substantially equal to three times the height of one of said zones.

6. A record as defined in claim 1 wherein each of said elements has a dimension parallel to said line that is less than the space in which the element lies.

7. A record as defined in claim 5 wherein said plurality of marking elements is preceded by a reference mark which extends parallel to said elements and which indicates by its end points, the extremities of said set of zones.

8. A record as defined in claim 7 wherein said record base comprises a bank check.

9. Apparatus for reading a record as defined in claim 8 comprising transport means for moving the record base in the direction substantially parallel to said zones, and reading means positioned adjacent said transport means for detecting said elements during operation of said transport means.

10. Apparatus for reading a record as defined in claim 1 comprising transport means for moving the record base in the direction substantially parallel to said zones, and reading means positioned adjacent said transport means for detecting said elements during operation of said transport means.

* * * * *